Sept. 30, 1958 A. F. HAUSER 2,853,903
MICRO-DRILLING MACHINE
Filed Aug. 31, 1956 4 Sheets-Sheet 1
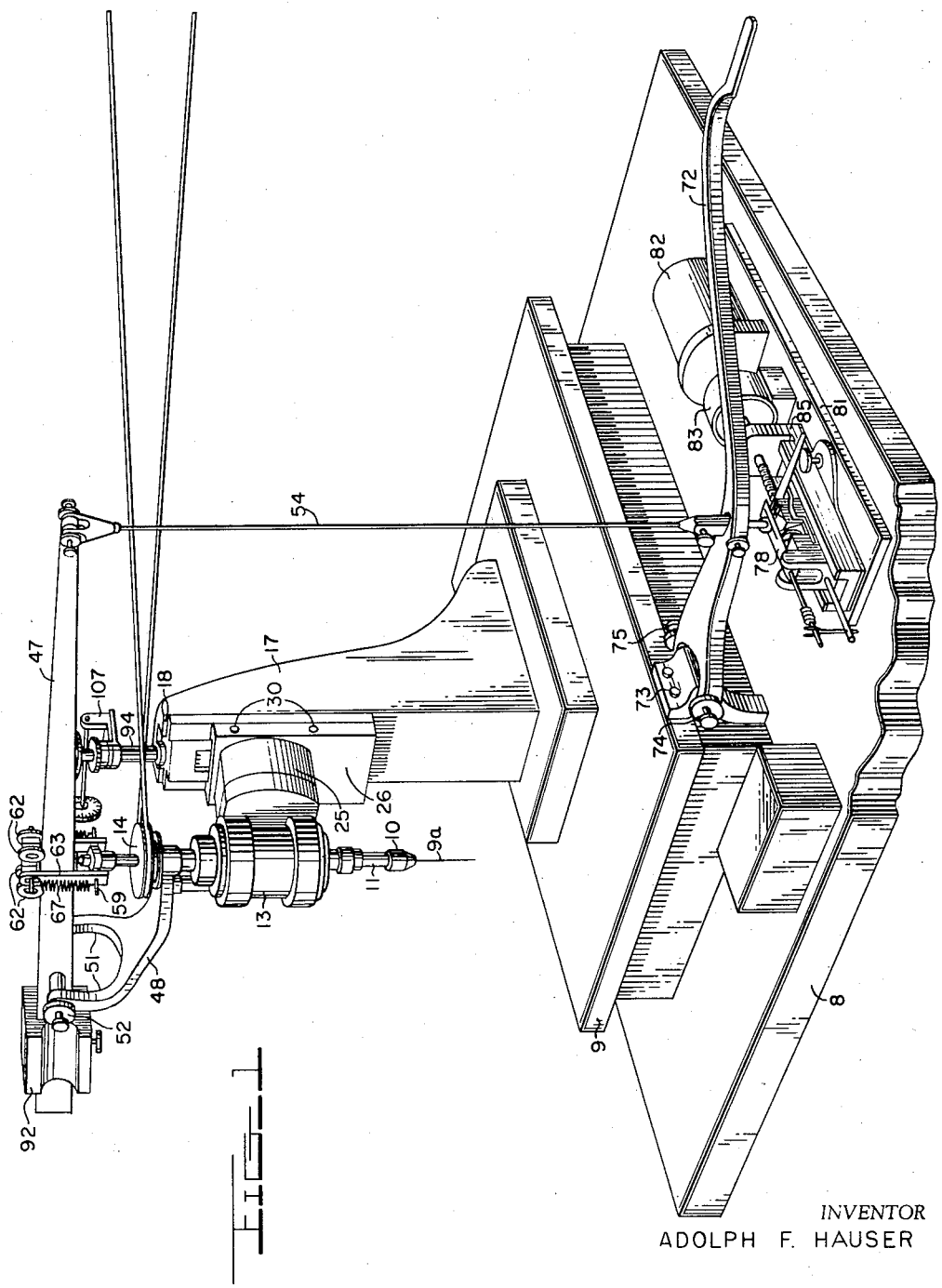
INVENTOR
ADOLPH F. HAUSER
BY
ATTORNEYS

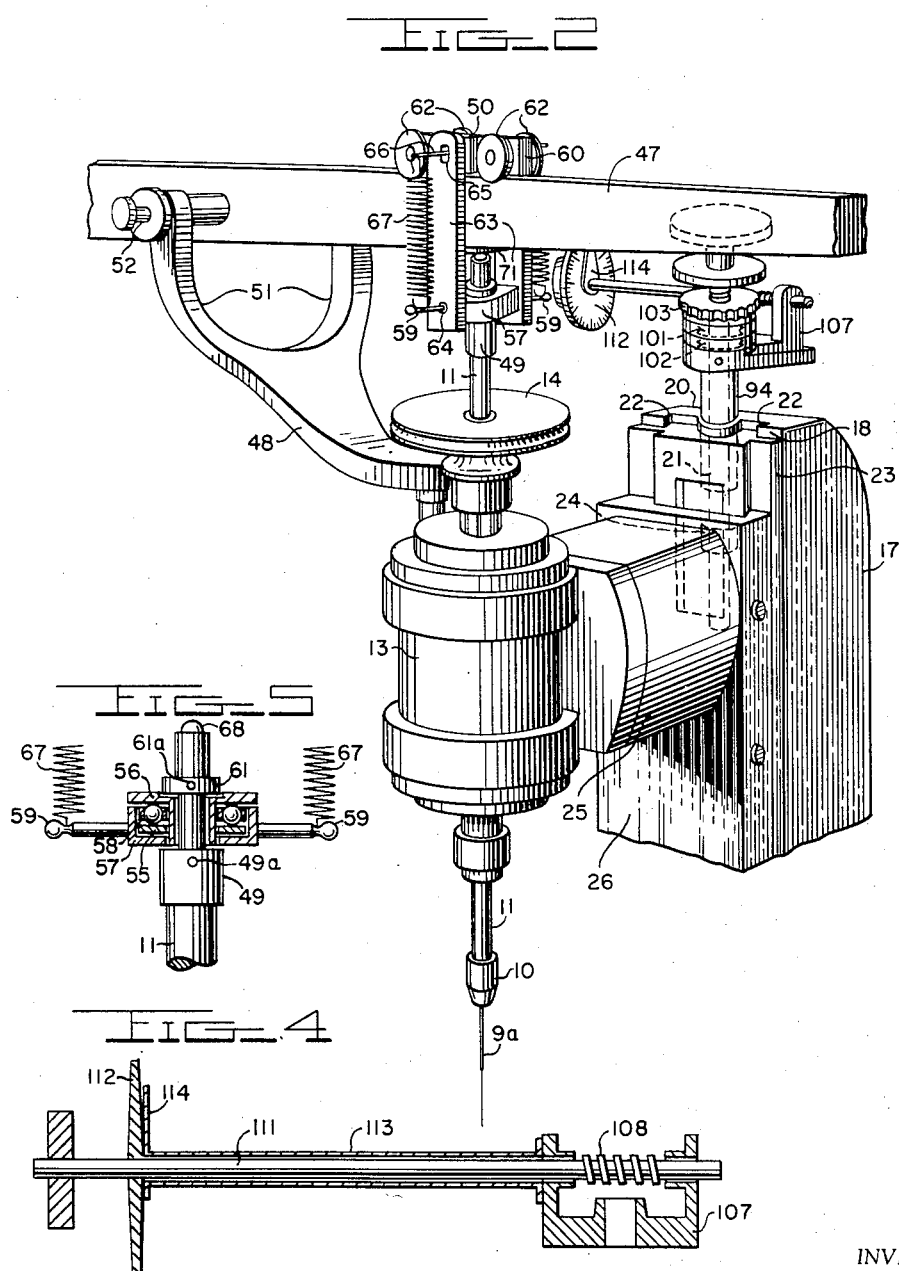

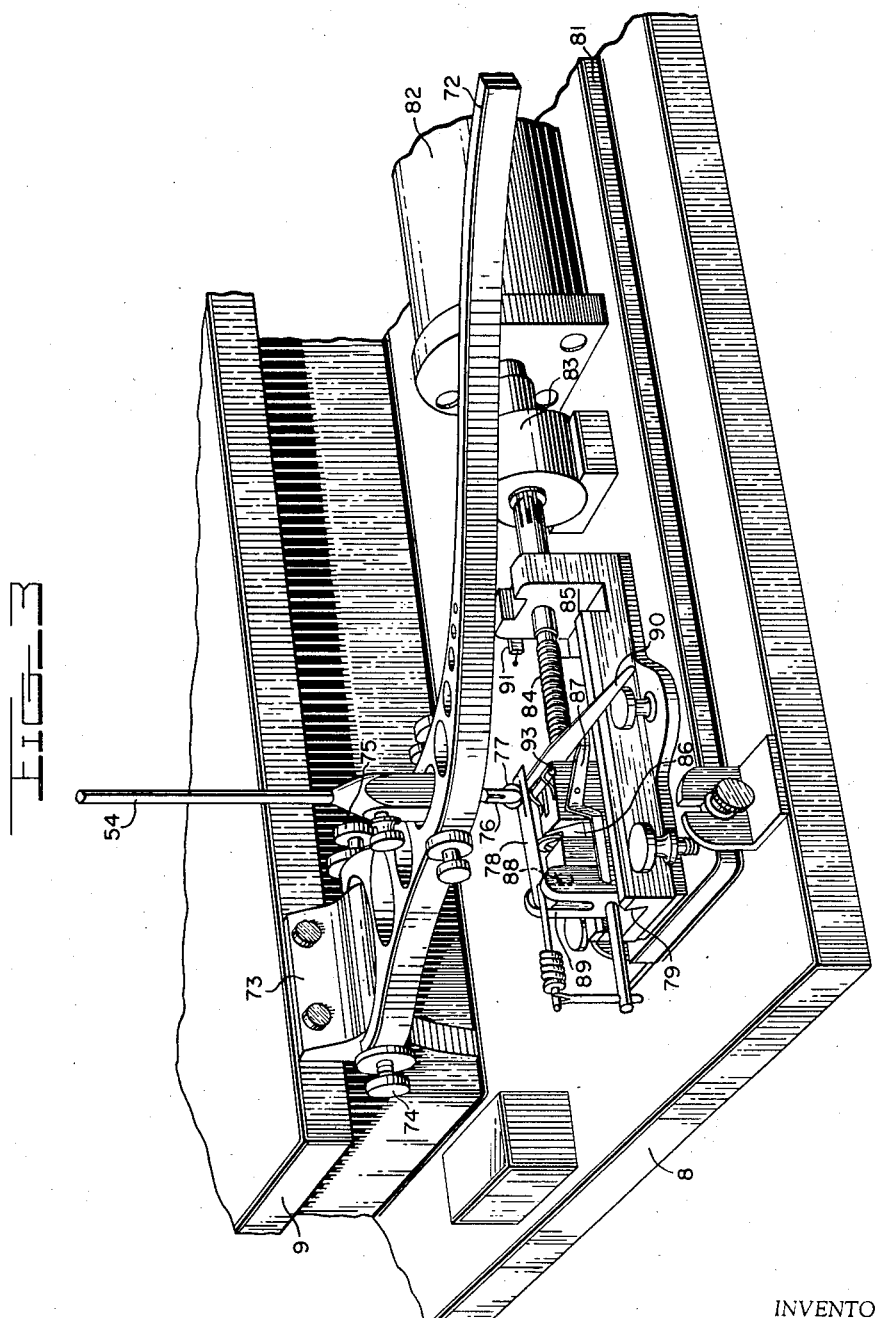

Sept. 30, 1958 A. F. HAUSER 2,853,903
MICRO-DRILLING MACHINE
Filed Aug. 31, 1956 4 Sheets-Sheet 4
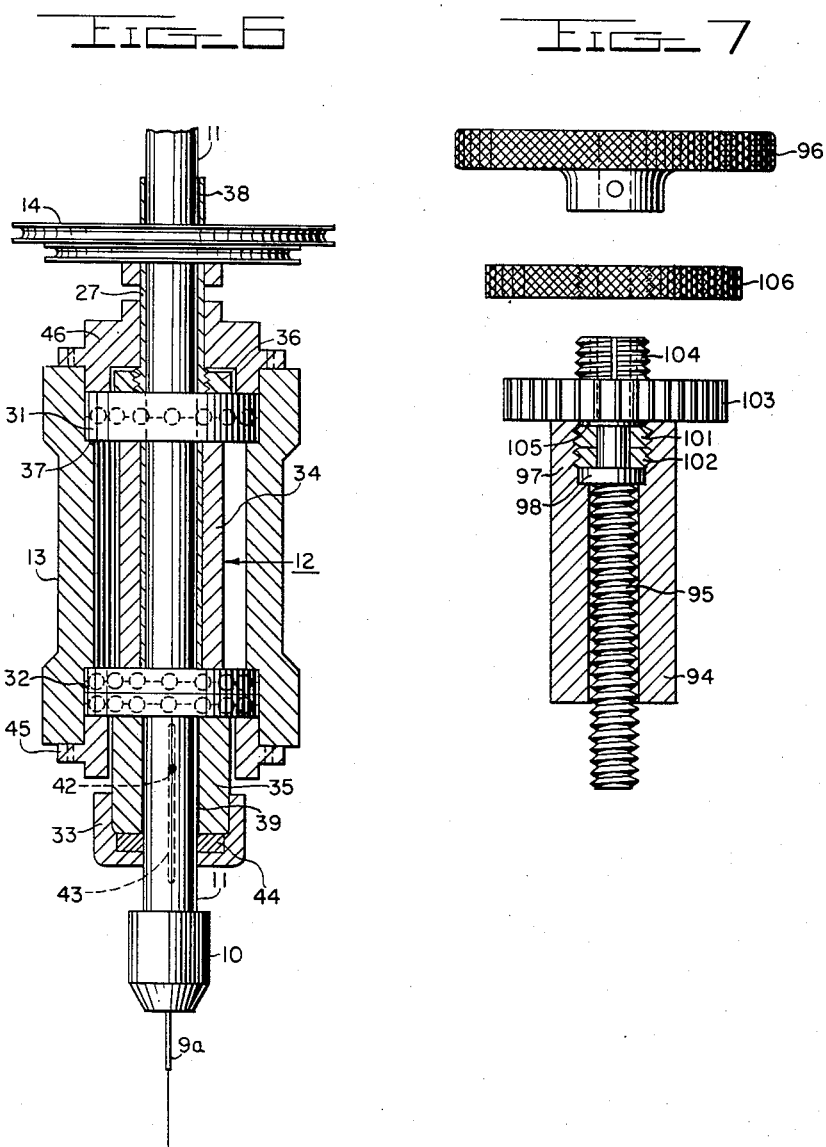
INVENTOR
ADOLPH F. HAUSER
ATTORNEYS

2,853,903

MICRO-DRILLING MACHINE

Adolph F. Hauser, Baltimore, Md.

Application August 31, 1956, Serial No. 607,532

3 Claims. (Cl. 77—19)

(Granted under Title 35, U. S. Code (1952), sec. 266)

The invention described herein may be manufactured and used by or for the Government of the United States of America for governmental purposes without the payment of any royalties thereon or therefor.

This invention relates to ultra-sensitive mechanisms for drilling relatively small holes having diameters of the order of 0.001 of an inch, greater or less, in a work piece. More particularly, the present invention relates to a sensitive control means for positioning and feeding a drill of such a mechanism through a work piece.

In the past, mechanisms for drilling small holes have been available, however, all such prior art mechanisms are unsatisfactory for one reason or another. Horizontal drill mechanisms are slow, bulky, expensive and require an operator for every four or five machines. Vertical drill mechanisms in general are more satisfactory than horizontal drills but again prior art vertical drill mechanisms have disadvantages, such as, inability to drill holes of precise diameter, and short drill life because of inadequate control wherein, excessive pressure on the drill frequently occurs causing the drill to become blunt or bent-out of shape. Additionally, some vertical drill mechanisms employ gravity feed requiring extreme lightness of the drill spindle and delicate bearings which may be adversely affected by dirt and dust particles.

The present invention overcomes the above shortcomings and provides a drill mechanism which can be accurately positioned and set to drill to a desired depth without any undue pressure on the drill. This is done by incorporating a special feed control mechanism for the drill spindle to control the axial movement of the spindle. This control mechanism allows the drill to center correctly and then feeds the drill through the work piece at a predetermined rate and to a desired depth. An automatic "cut-off" is incorporated to allow one operator to operate a plurality of machines thereby reducing labor rates and increasing production.

An object of the present invention is to provide a micro-drilling machine capable of drilling accurately and without damage to the drill or the work piece.

Another object of the present invention is to provide a novel feed control device for controlling the axial motion of a micro-drill spindle and for limiting the downward movement of the spindle.

Yet another object of the present invention is to enable one to control the movement of a drill spindle automatically or by hand.

Still another object of the present invention is to provide a drill device which is balanced to move freely up or down with the slightest touch.

Other and more specific objects of this invention will become apparent upon a careful consideration of the following detailed description when taken together with the accompanying drawings in which;

Fig. 1 is an elevation view of a typical drill mechanism showing the feed control mechanism of the present invention incorporated therein;

Fig. 2 shows the feed control mechanism connected with the drill spindle and the adjusting mechanism for positioning the drill housing;

Fig. 3 is a detailed illustration of the automatic control mechanism for automatically feeding and controlling the axial motion of the drill;

Fig. 4 is a cutaway view of the hand operated drive for adjusting the drill housing;

Fig. 5 is an enlarged cutaway view of the bearing assembly on the end of the drill spindle;

Fig. 6 is a view illustrating the quill drive mechanism, and

Fig. 7 is a detailed sectional view of the adjusting mechanism.

In accordance with the present invention, apparatus is provided wherein a drill is positioned for accurately controlled axial motion toward and away from a base on which a work piece is positioned to be drilled. Apparatus for controlling the axial motion of the drill is connected to the drill spindle in a novel manner to prevent damage to the drill and to control the feed of the drill into the work piece. Rotary motion of the drill is provided by a pulley fixed to a quill drive means. The quill is suitably journalled at each end to permit only rotary motion thereof. The spindle is mounted within the quill and is in engagement therewith by a keyway arrangement or splines to provide simultaneous rotation of the quill and spindle. Such a splined or keyed arrangement allows axial as well as rotary motion of the spindle.

With particular reference to Fig. 1 of the drawing, the drill mechanism indicated therein is built on a suitable bench 8 and includes a base member or frame plate 9. Additional structure shown provides support, rotation and axial motion of drill 9a relative to frame plate 9. Drill 9a is held by a suitable chuck ararngement 10 mounted on one end of a spindle 11.

Rotary motion of spindle 11 is provided by a suitable quill drive mechanism 12 shown in Fig. 6 which in turn is driven by any well known means such as the V-belt arrangement which includes the drive pulley 14. It is preferable, in order to avoid any thrust forces upon spindle 11 due to the drive arrangement, that pulley 14 be affixed to the outer surface of the quill which rotates in bearings 31 and 32 carried by the drill housing and that the spindle 11 be affixed to the inner surface of the quill by a slot and pin arrangement or the like so as to permit free axial motion. For this purpose, the quill carries bushings 38 and 39 on each end thereof.

As shown in Fig. 2, drill housing 13 is held in position relative to frame plate 9 and is directly supported by an upright housing 17 connected to the base. Housing 17 has in side 18 a rectangular opening 21 and two V-shaped grooves 22 extending longitudinally thereof and a hole in the top which extends longitudinally to the rectangular opening. A drill slide member 23 having V-shaped grooves matching with grooves 22 is slidably secured relative to the upright housing 17 and has a tab 24 thereon which extends into the rectangular opening of the upright member to receive an adjusting screw to enable adjustment of the drill housing with respect to the frame plate. The drill housing 13 is rigidly connected to a spacer 25 which in turn is rigidly connected to an adjustable sliding member 26 which has V-shaped grooves in one face thereof and is manually adjustable relative to the drill slide member 23 by loosening hold down bolts 30. The upright member provides a support and adjusting means for the drill housing.

Rotary motion of spindle 11 is provided by pulley 14 affixed to quill 12 arranged within drill housing 13. As shown in detail in Fig. 6, the quill comprises a rotatable tubular member 27 having an enlarged end portion 35 within which the spindle 11 is supported to permit relative axial movement and restrain any relative rotation. The tubular member 27 has appropriate bearings 31 and 32 thereon secured within the drill housing. Bearing 32 rests against a cap 45 on the bottom of the housing 13 and is spaced from bearing 31 by a spacer 34 while the inner race of bearing 31 is held in position against the spacer by a nut 36 screwed onto the tubular member 27. The outer race of bearing 31 rests against a shoulder 37 milled into the wall of the drill housing. The tubular member 27 is provided with nylon graphite bushings 38 and 39 on the inner side at opposite ends thereof to minimize friction in axial motion of the spindle. The end of the tubular member nearest the drill chuck contains a pin 42 which fits through a slot 43 in the spindle to allow axial motion and to provide rotary motion for the spindle. A molybdenum disulphide tin-lead alloy bearing 44 which requires no lubrication is fitted onto the end of quill 12 and held in position by a cap 33 to provide additional support for the spindle when chucking the drill. The drill housing caps 44 and 45 prevent dirt and dust from entering the bearings in addition to holding bearings 31 and 32 in position.

Referring again to Fig. 2, axial motion of spindle 11 is provided by a control arm 47 supported from the drill housing 13 by a bracket 48 which has a forked end 51. The forked end has pivots 52 thereon which provide free movement and securing means for the control arm. The control arm is linked to the upper end of spindle 11 by a dolly assembly means 50. The other end of the control arm 47 is connected with a rod 54 as shown in Fig. 1 which engages a control means through arm 72 to impart axial motion to the spindle.

As shown in detail in Fig. 5, the upper end of spindle 11 includes a thrust bearing assembly which connects the spindle with the dolly assembly 50. The bearing assembly includes a two piece housing 56 and 57 each having two sides at 90 degrees to each other which forms a cylindrical cavity therebetween. The two piece housing is loosely secured between a collar 49 secured to the spindle by a pin 49a and a hat shaped member which includes a nut 61 and the end portion having bearing 68 on the end thereof, nut 61 screws onto the other end of the spindle and is locked from turning by a lock screw 61a. Housing member 56 forms the top and inner portion of the housing while member 57 forms the outer and lower surface. The inner surface of member 56 contacts the spindle and rotates therewith, whereas the member 57 is stationary and has close running clearance with member 56. The outer surface of member 57 is provided with pins 59 that extend outwardly therefrom on opposite sides thereof to provide means by which the spindle is held against arm 47 through the use of links 63 and springs 67. The cylindrical cavity between the two housing members has a hardened steel bearing race 55 and a set of ball bearings therein positioned around the inner portion of member 56. The ball bearings are secured within holes in a brass ring 58 having a thickness less than the diameter of the balls such that the bearings have riding contact with the bearing race 55 on the bottom thereof and with the top portion of the housing member 56 immediately above the bearings. The ball bearings provide free running for the spindle in relation to the dolly assembly without any radial thrust.

In order to permit movement between the spindle and the control arm 47, a special linkage shown in more detail in Fig. 2 connects the spindle to the arm whereby axial motion can be imparted to the spindle without introducing any radial thrust. The assembly includes a dolly 60, which is supported on control arm 47 by flanged wheels 62 mounted upon antifriction bearings. Dolly 60 is connected with pins 59 of the spindle bearing assembly by two links 63 each having a hole 64 in one end thereof and a slot 65 in the other end to provide for a small movement. The holes 64 engage protruding pins 59 of the spindle upper bearing assembly and the slots 65 engages pins 66 extending centrally from the dolly 60. On the outer side of each link 63, a preloading spring 67 is secured between each pin 59 and 66 to carry the weight of the spindle and to hold the end of the spindle against the bottom of the control arm. For the purpose of decreasing friction between the control arm and the top of the spindle, a jewel bearing 68 is secured in the end of the spindle and rides against a lapped steel plate 71 secured to the adjacent side of the control arm.

Arm 72, which as previously mentioned is linked to control arm 47 by vertical rod 54 is supported from bracket 73 by bearing pivots 74 and 75. Bracket 73 is mounted onto the frame plate 9 in any suitable fashion such as by bolts or screws. Attached to the lower end of vertical rod 54 (Fig. 3) is a sleeve tip 76 carrying a roller 77 which rests upon a hinged sine bar slide 78 which is a portion of a carriage assembly 85 that provides a mechanical control for the spindle 11.

As typified in Fig. 3 the mechanical control assembly is mounted on a plate 81 which is secured to work bench 8 and includes a motor 82, a reduction gear box 83, a lead screw 84, a carriage assembly 85 and a roller cam 86. In the arrangement shown the roller cam 86 is keyed to the lead screw 84 for simultaneous rotary motion therewith but is unrestrained against axial motion except as limited by carriage assembly 85. Carriage assembly 85 is slidably secured in track 79 and is provided with a suitable drive arrangement such as a half-nut, not shown, which can be selectively engaged with lead screw 84 by manipulation of lever 90 upon which it is mounted. The sine bar slide 78 provides a control for the drill, which if desired may supplement or assist hand control by movement of arm 72. As shown in Fig. 3, the sine bar is hinged in slot 88 within uprights 89. The sine bar slide 78 is raised to a level position as the cam 86 passes under the sine bar causing the drill control arm 47 to move upwardly. An automatic stop mechanism for the mechanical control is provided in the form of a switch 91 which is positioned and connected so as to stop motor 82 when carriage assembly 85 reaches a selected extreme position. To facilitate mechanical drill control, a counterweight 92 is mounted on arm 47 and is adjusted to where a slight downward pressure is maintained on roller 77, holding roller 77 against the sine bar slide 78.

In the drilling operation, the work piece is positioned under the drill and the drill is adjusted for "precontact" with a very close clearance. The drill drive is started to rotate the drill, then the control motor 82 is started to operate the control means. The control motor turns screw 84 through reduction gear 83 which imparts movement to the carriage by engaging the half-nut, not shown, and turns the cam 86. Cam 86 contacts the lower side of hinged sine bar slide 78 each revolution of the screw, raising the control arm 47 through movement of vertical rod 54 which in turn raises the drill from the work piece. As screw 84 rotates, it rotates against the half-nut, not shown, and moves the carriage assembly 85 forward. Typically the speed and movement of the slide is such that after approximately 3 minutes of drill operation the slide will traverse the complete path toward the motor to operate stop switch 91.

The hinged sine bar slide 78 is positioned on the slide table at a preselected angle which slopes downwardly away from the direction of travel of the carriage assembly, the slope depending on the height of pin 93 or any other adjustable means such as a cam incorporated to facilitate height adjustment. Motion of the roller 77 along the sine bar slide 78 resulting from motion of the carriage assembly 85 lowers vertical rod 54, which feeds drill 9a into the work that is supported in any suitable manner such as by a vise placed upon frame plate 9. Each revolution of the feed screw advances the slide table approximately $\frac{1}{32}$ of an inch and consequently lowers the drill into the work a preselected amount depending on the angle of the sine bar slide 78. This feed is continuous during motion of carriage assembly 85, however, the action of cam 86 causes periodic withdrawal of the drill from the work to facilitate chip discharge. Such pumping action caused by withdrawal of the drill clears the cavity of chips and when a light cooling lubricant is used during drilling, the centrifugal action of the drill causes the coolant to form a whirlpool and the small chips whirl in circles away from the drill. This action prevents abrasion of the drill and the finished work.

Although automatic feed is desirable, manual feed by operation of control arm 72 is also practical and may be desirable in certain instances.

To facilitate adjustment of the drill relative to the work piece, a vernier adjusting mechanism shown in detail in Figs. 2 and 7 is mounted above upright housing 17 on a tubular post 94 secured in the longitudinal hole therein. The adjusting means mounted on post 94 includes a spindle having an adjusting screw 95 on one end thereof which extends downwardly through the post into the longitudinal slot 21 of the upright housing 17 and screws into the tab 24 on the drill slide member 23. The opposite end of the spindle has a knob 96 affixed thereto to facilitate rotation of the screw and adjustment of the drill. The tubular post has a milled out end portion 97 forming a means for securing the spindle for rotary motion. The spindle has a thrust bearing 98 rigidly secured thereto which rides against a shoulder in the milled out portion of the post and is held in position by two adjusting nuts 101 and 102. Nut 101 screws against nut 102 locking the nut in position to maintain proper clearance between the thrust bearing and the nut 102. A free wheeling slip gear 103 having a slotted tapered hub 104 on one side is positioned about the adjusting spindle such that a shoulder 105 rotates against one of the adjacent adjusting nuts holding the thrust bearing in place. The nut 106 screws down over the slotted tapered hub to tighten the gear against the spindle of the adjusting screw. A bracket 107 mounted onto the end of the post 94 adjacent the end portion 97 provides a means for securing a worm gear 108 that engages the slip gear 103. The worm gear has a shaft 111 extending therefrom upon which a dial 112 is secured. The dial is calibrated to denote $1/200,000$ in. excursion of the adjusting spindle up or down when the adjusting screw is rotated by the worm gear, the amount being indicated by a pointer 114 secured to a tubular housing 113 secured to the bracket and over the worm shaft extension.

The vernier control means permits rapid adjustment of the drill when the slip gear free wheels by rotating the adjusting screw with the turn knob 96 which moves the drill slide 23 by turning the screw against tab 24. When there is need of a fine adjustment, the slip gear is secured to the spindle by tightening the nut 106 against the hub which secures the slip gear to the spindle and then the screw can be rotated by the worm gear to move the adjusting screw according to the amount denoted by the dial on the worm gear extension.

Operation of the device for mechanical feed is as follows:

The counterweight on the end of the control arm is adjusted for free downward movement of the drill spindle. The pin 65 positioned under the forward end of the sine bar slide and which determines the feed rate of the drill is chosen according to the material being drilled, drill rotation rate and depth of the hole desired. After having selected the proper slope of the sine bar for the correct feed of the drill, the proper drill is secured into the chuck and the laid out work piece is positioned under the drill. The drill is then lowered by hand operated knob 96 until the drill just clears the work piece, then the lock nut 106 is turned against the slip gear 103 securing it for movement of the adjusting screw 95 by use of the dial 112. The vernier control allows for proper positioning of the work piece and centering of the drill. (The drill is so small that a magnifying glass of 36× power not shown is used when positioning the work piece in the proper position and for inspection of the work during drilling.)

After the work piece has been secured in place, the drill drive means is started to produce rotary motion for the drill spindle. After the drill has started to rotate, the motor that controls the mechanical control means is switched on and the half-nut on the carriage assembly is engaged with the lead screw. Motor 82 drives lead screw 84 which advances the carriage 85 and sine bar slide 78 and rotates cam 86. Cam 86 rotates against the sine bar slide intermittently forcing the bar upward which forces the control arm upward to produce axial motion of the drill spindle. As the carriage assembly moves toward the motor, the drill is lowered into the work according to the slope of the sine bar until the carriage contacts stop switch 91 to turn the carriage drive motor off. Then the half-nut on the carriage that engages the drive screw is raised and the carriage is moved back to its original starting position for another run. The vernier is then rotated to lower the drill unit a distance equal to that drilled during the previous operation and the device is then ready for another run.

From the above it is seen that the present sensitive drill device can be used to make holes of various diameters and depths.

Obviously many modifications and variations of the present invention are possible in the light of the above teachings. It is therefore to be understood, that within the scope of the appended claims the invention may be practiced otherwise than as specifically described.

What is claimed is:

1. A drilling machine comprising a base, a support, a drill housing positioned on said support, a quill drive mechanism secured in said drill housing, a drill spindle mounted for rotary and axial motion in said quill, a spindle control lever, means for movably connecting said spindle control lever to said spindle, a carriage, a slide sine bar on said carriage, a rod connected with one end of said spindle control lever and in contact with said slide sine bar, a carriage drive means, a cam means rotatable with said carriage drive means, said cam adapted to intermittently raise said slide bar to produce axial motion of said drill spindle and means for rotating said quill to produce rotary motion of said drill spindle.

2. A drilling mechanism for drilling small holes in a work piece comprising a base, a support, a drill housing mounted on said support, a quill drive mechanism secured in said drill housing, a drill spindle mounted for reciprocating axial motion in said quill and rotatable therewith, means for adjusting the axial position of said drill housing, a spindle control means, said control means being movably connected with one end of said drill spindle for tendering reciprocating motion thereto, a carriage, a slide sine bar on said carriage, a rod connected at one end with one end of said spindle control means, the other end of said rod contacting said slide sine bar, a carriage drive means, a cam means rotatable with said carriage drive means, said cam adapted to intermittently contact said slide sine bar raising said sine bar to render axial motion to said drill spindle, and means for rotating said quill to render rotary motion to said drill spindle.

3. In a machine for drilling small holes in a work piece, a base, a support, a drill housing mounted on said support, a quill drive mechanism secured within said drill housing, a freely slidable drill spindle mounted for reciprocatory movement along the axis of said quill and for rotation therewith, bearing means on one end of said drill spindle, a spindle control lever, a dolly connected to said drill spindle for movably interconnecting said bearing means with said spindle control lever to provide constant axial alignment of said drill spindle, a control arm connected with said base, a rod connected at one end to said control arm and at the opposite end to one end of said spindle control lever, said control arm adapted to directly provide said reciprocatory movement to said drill spindle in directions toward and away from said work piece, and means for rotating said quill to impart rotary motion for said drill spindle.

References Cited in the file of this patent

UNITED STATES PATENTS

| | | |
|---|---|---|
| 1,763,552 | Cook | June 10, 1930 |
| 2,439,965 | Cupler | Apr. 20, 1948 |

FOREIGN PATENTS

| | | |
|---|---|---|
| 896,638 | France | May 2, 1944 |